(12) United States Patent
Siu et al.

(10) Patent No.: US 12,455,227 B2
(45) Date of Patent: Oct. 28, 2025

(54) ENCLOSED, MULTI-CHAMBER METERING AND MIXING SYSTEM USED FOR URINALYSIS

(71) Applicant: International Business Machines Corporation, Armonk, NY (US)

(72) Inventors: Vince Siu, Ontario (CA); Bing Dang, Chappaqua, NY (US); Bo Wen, New York, NY (US); Kuan Yu Hsieh, Changhua (TW)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 18/156,692

(22) Filed: Jan. 19, 2023

(65) Prior Publication Data
US 2024/0248025 A1     Jul. 25, 2024

(51) Int. Cl.
| | | |
|---|---|---|
| *G01N 1/38* | (2006.01) | |
| *G01N 21/03* | (2006.01) | |
| *G01N 21/11* | (2006.01) | |
| *G01N 21/25* | (2006.01) | |

(52) U.S. Cl.
CPC ............... *G01N 21/11* (2013.01); *G01N 1/38* (2013.01); *G01N 21/03* (2013.01); *G01N 21/251* (2013.01); *G01N 2021/0325* (2013.01)

(58) Field of Classification Search
CPC .......... G01N 21/11; G01N 1/38; G01N 21/03; G01N 21/251; G01N 2021/0325; G01N 33/00; G01N 2035/00524; G01N 2035/00534
See application file for complete search history.

(56) References Cited

U.S. PATENT DOCUMENTS

| | | | |
|---|---|---|---|
| 5,897,840 A | 4/1999 | Owens, Jr. | |
| 9,222,954 B2 * | 12/2015 | Lentz | ................ G01N 35/1011 |
| 10,228,363 B2 | 3/2019 | Okamura | |

(Continued)

FOREIGN PATENT DOCUMENTS

| | | |
|---|---|---|
| CN | 109225032 A | 1/2019 |
| CN | 110394107 A | 11/2019 |

(Continued)

OTHER PUBLICATIONS

BD Vacutainer® complete urine collection kits. https://www.bd.com/en-in/offerings/capabilities/specimen-collection/urine-specimen-collection/bd-vacutainer-complete-urine-collection-kits <Retrieved Jan. 10, 2023>.

(Continued)

*Primary Examiner* — Abdullahi Nur
(74) *Attorney, Agent, or Firm* — Kimberly Zillig

(57) ABSTRACT

A liquid metering and mixing system for preparing a plurality of samples for analysis. The system includes: a liquid metering apparatus disposed in fluid communication with a sample holder and a plurality of reaction chambers and configured to meter a volume of a liquid into each of the plurality of reaction chambers, wherein each of the plurality of reaction chambers includes a reagent; and a mixing apparatus comprising a plurality of mixing elements, wherein each of the plurality of mixing elements is disposed in a corresponding reaction chamber of the plurality of reaction chambers and is adapted to mix the volume of the liquid with the reagent in preparation for analysis.

20 Claims, 9 Drawing Sheets

(56) References Cited

U.S. PATENT DOCUMENTS

| | | | |
|---|---|---|---|
| 10,928,325 B1 | 2/2021 | Mccord | |
| 11,006,880 B2 | 5/2021 | Elia | |
| 11,422,133 B2 | 8/2022 | Melanson | |
| 2003/0003591 A1* | 1/2003 | LaCourt | B01L 3/50851 422/63 |
| 2003/0022380 A1* | 1/2003 | Jakubowicz | B01L 3/0275 422/562 |
| 2003/0058736 A1 | 3/2003 | Nielsen | |
| 2004/0219062 A1* | 11/2004 | Platano | G01N 35/00712 422/63 |
| 2006/0024838 A1 | 2/2006 | Leaman, Jr. | |
| 2011/0189785 A1* | 8/2011 | Gutmann | B01L 3/502738 422/68.1 |
| 2012/0196280 A1* | 8/2012 | Karlsen | B01L 3/502738 435/6.1 |
| 2014/0057279 A1* | 2/2014 | Malik | F17D 3/00 435/6.12 |
| 2014/0099240 A1 | 4/2014 | Misono | |
| 2016/0222474 A1* | 8/2016 | Cadeo | B01D 21/01 |
| 2018/0008944 A1 | 1/2018 | Ozeki | |
| 2018/0103934 A1 | 4/2018 | Ealovega | |
| 2019/0240654 A1 | 8/2019 | Stephens | |
| 2020/0011884 A1 | 1/2020 | Gorin | |
| 2020/0290036 A1 | 9/2020 | Marshall | |
| 2021/0113131 A1 | 4/2021 | Lee | |
| 2021/0275959 A1 | 9/2021 | Saito | |
| 2022/0072532 A1 | 3/2022 | Mccord | |
| 2022/0143609 A1 | 5/2022 | Xu | |
| 2022/0252496 A1 | 8/2022 | Werk | |

FOREIGN PATENT DOCUMENTS

| | | |
|---|---|---|
| CN | 112710575 A | 4/2021 |
| WO | 2024/153467 A1 | 7/2024 |

OTHER PUBLICATIONS

Berlanda, S. F., et al. (2021). Recent Advances in Microfluidic Technology for Bioanalysis and Diagnostics. Analytical Chemistry, 93(1), 311-331. doi:10.1021/acs.analchem.0c04366.

Brochure—BD Vacutainer Luer-Lok Access Device. (2006) https://tinyurl.com/3n9ca73e <Retrieved on Jan. 10, 2023>.

Pham Att, et al. Portable Colorimetric Device with Commercial Microplates for Quantitative Detection of Urine Biomarkers: Design, Development, and Clinical Evaluation. Biosensors (Basel). Sep. 4, 2022;12(9):723. doi: 10.3390/bios12090723. PMID: 36140108; PMCID: PMC9496577.

Pugia MJ, et al. Microfluidic tool box as technology platform for hand-held diagnostics. Clin Chem. Oct. 2005;51(10):1923-32. doi: 10.1373/clinchem.2005.052498. Epub Jul. 28, 2005. PMID: 16055433.

Siu, V. S., et al. (2022). Toward a Quantitative Colorimeter for Point-of-Care Nitrite Detection. ACS Omega, 7(13), 11126-11134. doi:10.1021/acsomega.1c07205.

Smith, G. T. et al. (2016). Robust dipstick urinalysis using a low-cost, micro-volume slipping manifold and mobile phone platform. Lab on a chip, 16(11), 2069-2078. https://doi.org/10.1039/c6lc00340k.

Vacutainer Blood Transfer Device by BD (Becton Dickinson)https://www.vitalitymedical.com/vacutainer-blood-transfer-device-becton dickinson-bd-364880.html?keyword= <Retrieved Jan. 10, 2023>.

Xiang, J. et al. A 3D printed centrifugal microfluidic platform for automated colorimetric urinalysis. Microsyst Technol 26, 291-299 (2020). https://doi.org/10.1007/s00542-019-04709-4.

Notification of Transmittal of the International Search Report and the Written Opinion of the International Searching Authority, or the Declaration for Application No. PCT/EP2024/050039, Apr. 16, 2024, 40 pages.

* cited by examiner

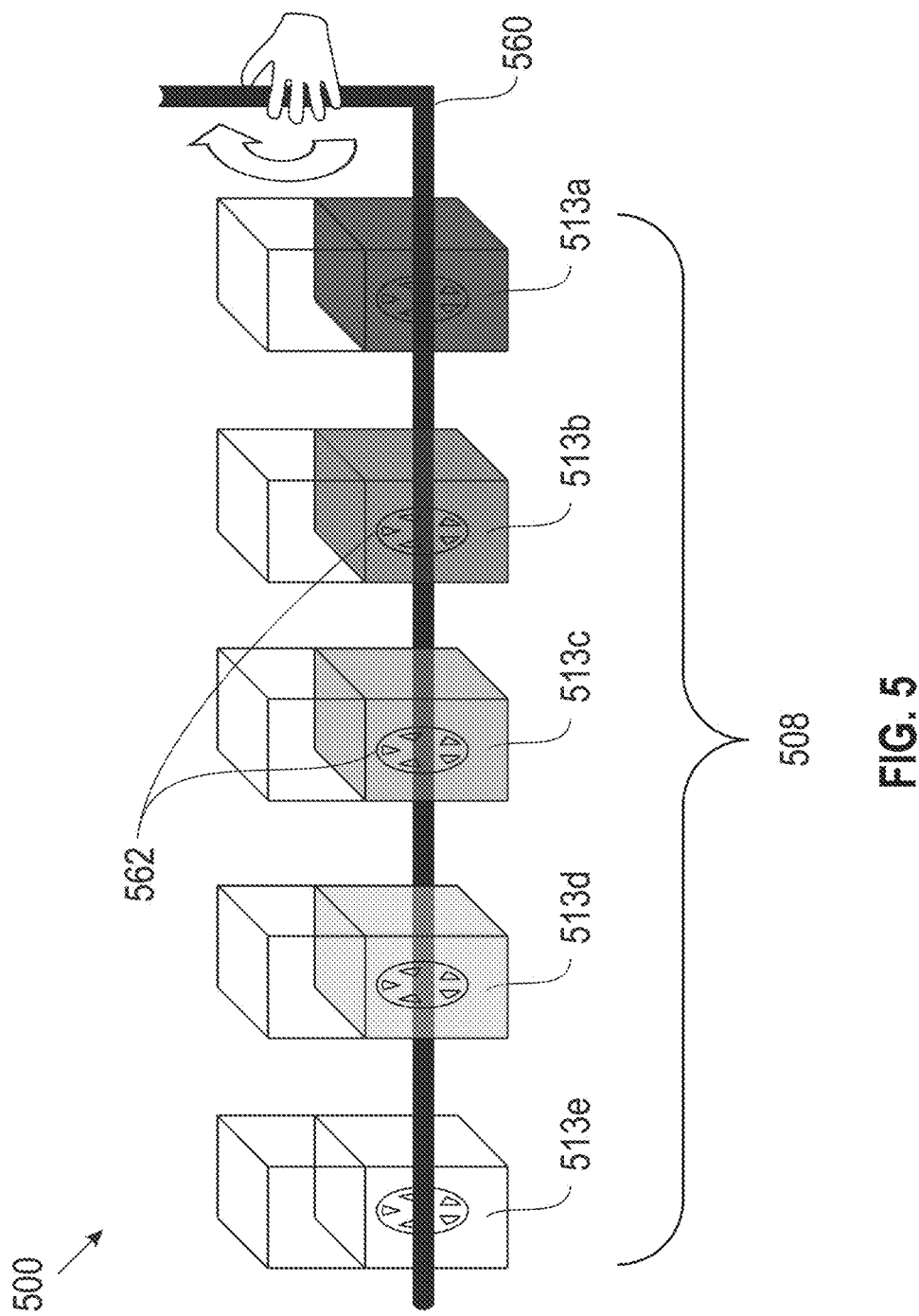

ENCLOSED, MULTI-CHAMBER METERING AND MIXING SYSTEM USED FOR URINALYSIS

BACKGROUND

The present disclosure relates generally to a liquid sample analysis system, and more particularly to an enclosed, multi-chamber metering and mixing system used for urinalysis.

Urine specimens are taken from people for a variety of reasons. Hospitals take a urine specimen from a patient to conduct laboratory tests on the specimen to determine a patient's medical condition. Employers take urine specimens from employees to determine whether the employee has been using any illegal drugs. The vast majority of urine specimens are collected in medical facilities using existing collection devices that have one primary component in common, which is a generic plastic specimen-cup with a screw-on lid.

SUMMARY

According to some embodiments of the disclosure, there is a liquid metering and mixing system for preparing a plurality of samples for analysis. The system includes: a liquid metering apparatus disposed in fluid communication with a sample holder and a plurality of reaction chambers and configured to meter a volume of a liquid into each of the plurality of reaction chambers, wherein each of the plurality of reaction chambers includes a reagent; and a mixing apparatus comprising a plurality of mixing elements, wherein each of the plurality of mixing elements is disposed in a corresponding reaction chamber of the plurality of reaction chambers and is adapted to mix the volume of the liquid with the reagent in preparation for analysis.

According to some embodiments of the disclosure, there is a liquid sample testing system. The system includes: a liquid metering apparatus disposed in fluid communication with a sample holder and a plurality of reaction chambers and adapted to meter a volume of a liquid into each of the plurality of reaction chambers, wherein each of the plurality of reaction chambers includes a reagent; mixing apparatus comprising a plurality of mixing elements, wherein each of the plurality of mixing elements is disposed in a corresponding reaction chamber of the plurality of reaction chambers and is adapted to mix the volume of the liquid with the reagent in preparation for analysis; and a colorimeter disposed in optical communication with at least one of the plurality of reaction chambers.

According to some embodiments of the disclosure, there is a method of preparing a liquid sample for analysis. The method includes: metering a volume of the liquid sample into each of a plurality of reaction chambers that each include a reagent; and mixing the volume of the liquid sample with the reagent in each of the plurality of reaction chambers.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a schematic, perspective view of a mixing apparatus, in accordance with embodiments of the disclosure.

Figure 1:
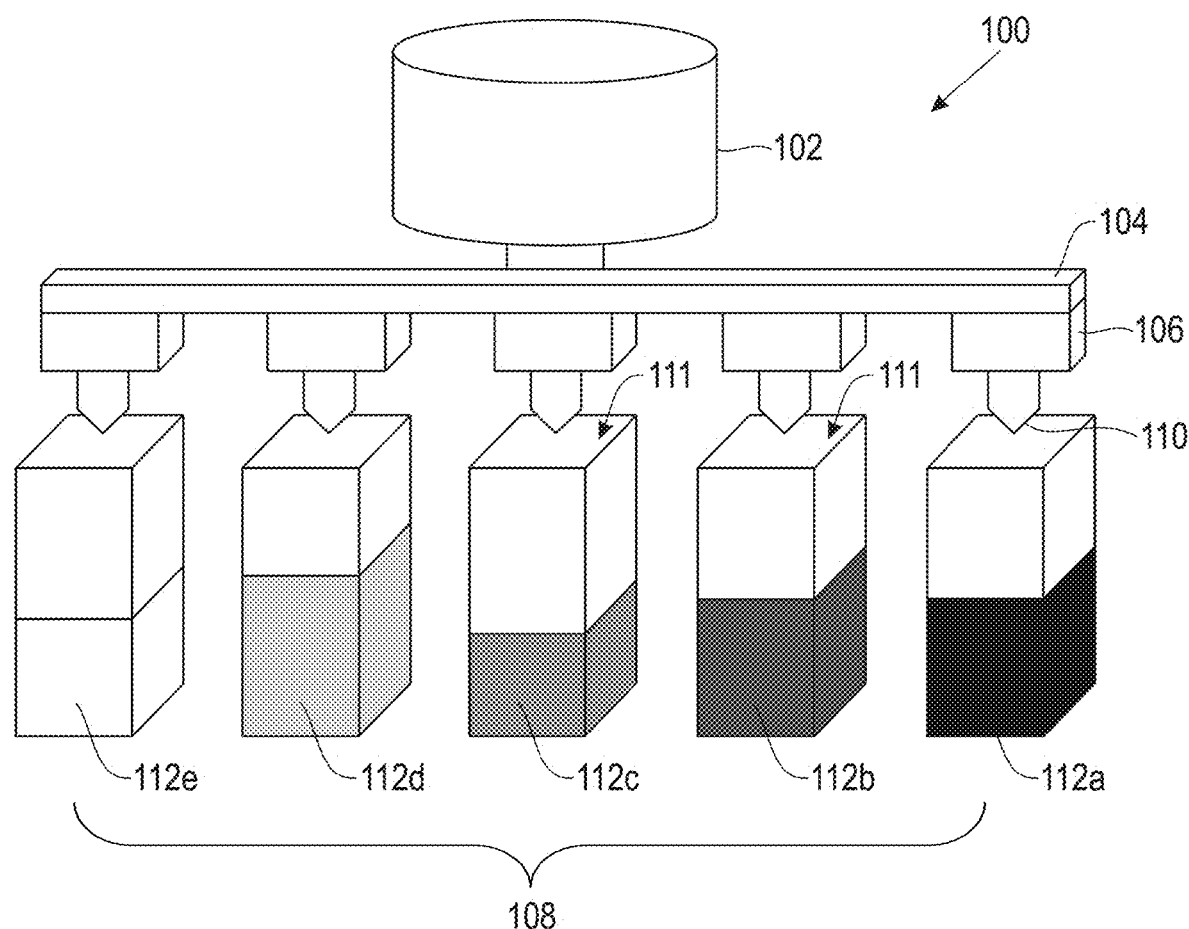
FIG. 1 is a schematic, perspective view of a metering apparatus, in accordance with embodiments of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to a liquid sample analysis system. Still more particularly, the present disclosure relates to an enclosed, multi-chamber metering and mixing system used for urinalysis, for example. While the present disclosure is not necessarily limited to such applications, various aspects of the disclosure can be appreciated through a discussion of various examples using this context.

Traditionally, urinalysis is performed using urinary dipsticks that measure the concentration of different analytes in urine in both clinical and at-home settings. In the clinic, vacuumed-sealed urine transport tubes are used to collect a fixed volume of urine from a urine specimen cup, but this is limited to a single tube collection at one time. The dipsticks are disposable, inexpensive to manufacture, easy-to-use and are read visually by eye. However, the readings are subjective and can be error-prone, with the accuracy being highly dependent upon proper sample preparation, correct interpretation of a reference color scale, and precise timing of a readout. More current technology includes the use of reflectance dipstick readers that are used by trained lab personnel to analyze urine specimens resulting in semi-quantitative results. Alternatively, benchtop clinical urine analyzers can be used by trained lab personnel to measure concentrations of urinary analytes quantitatively.

For some clinical conditions, such as chronic kidney disease, heart failure, Parkinson's disease, and multiple sclerosis, there is a need for periodic measurements of multiple biomarkers, ideally, in an at-home setting. For example, with chronic kidney disease, there is a clinical need to be able to quantitatively measure certain urinary analytes such as protein and creatinine, to determine an individual's urinary protein-to-creatinine (UPC) ratio. Since, currently, there exists no quantitative point-of-care urinalysis device for patients to do this type of testing at home, the patent must visit a lab to provide their urine sample that can be analyzed before a physician can adjust medication doses based on the results. If a patient could more frequently monitor their UPC ratio from home, a physician could remotely adjust the prescribed medication dose and make more personalized and tailored treatments, for example.

Currently, at-home users that use dipsticks would use a dip-and-wipe method of submerging an edge of the dipstick along a rim of the urine specimen cup to remove excess liquid. Not only does this method expose the user to an open urine specimen cup and potential mess from the excess liquid, but the volume of urine also exposed to each reagent pad is not controlled.

An at-home urine test should be safe and easy-to-use, and should be able to accurately measure multiple urinary analytes at one time. A workflow for transferring urine from a urine specimen cup to a reagent disc/cassette of a measurement tool is important. This transfer process should be easy to use, leak-proof, and provide accurate metering and mixing of the urine samples with analyte detection reagents.

There is a need for a system that can take a sample of urine from a urine specimen cup, and meter a desired amount of urine into multiple reaction chambers, such as cuvettes or vials that are pre-loaded with reagents, in a safe, leak-proof, and easy-to-use manner. Currently, there exists no quantitative point-of-care urinalysis tool for at-home use. An at-home metering and mixing apparatus or system that is safe and easy-to-use, would amplify the user workflow when combined with a digital urinalysis apparatus, for example.

Embodiments of the present disclosure relate to a liquid (e.g., urine) sample acquisition device that can obtain, meter and mix a urine sample with analyte detection reagents in one or more reaction chambers for subsequent downstream analyte/biomarker quantification. The embodiments address metering of a urine sample into multiple reaction chambers. The embodiments also address, after dispensing a correct or desired volume of urine into multiple reaction chambers, mixing the urine with multiple analyte detection reagents for analysis purposes.

A first embodiment of the disclosure includes a liquid metering apparatus that uses a set of metering reservoirs in order to meter a desired volume of liquid that can be delivered to reaction chambers using gravity induced flow. The first embodiment has the urine sample collection chamber connected to a distribution channel upstream to a set of metering reservoirs. The proper volume of liquid for the reaction chambers can be achieved by ensuring the volume of each metering reservoir is designed to deliver a desired volume of liquid sample to the reaction chambers. The distribution channel and metering reservoirs can be coated with anionic, cationic or zwitterionic surfactants to improve surface wettability and ensure optimal flow and transfer of liquid/urine sample. In this embodiment, the liquid or urine sample can flow into the reaction chambers, pre-loaded with reagents, via gravity through dispensing needles. The amount of liquid sample added to each reaction chamber can be the same or can be different depending on the reagent pre-loaded into each of the reaction chambers, which also depends upon the analyte being detected. This embodiment can be used with detection reagents that are present in either liquid or dried form.

A second embodiment can use a pressure differential between the liquid metering apparatus and the reaction chambers to pull a desired volume of a liquid sample into each of the reaction chambers. The second embodiment still utilizes the same urine sample collection chamber connected to a distribution channel spanning the reaction chambers. In this embodiment, the reaction chambers are vacuum sealed by an amount of vacuum that corresponds to an amount (or volume) of liquid that each specific container, or reaction chamber, needs. In this case, each reaction chamber is vacuumed-sealed, and the liquid flows to the reaction chambers via the pressure difference and through dispensing needles, for example. The amount of liquid sample added to each reaction chamber can be the same or can be different depending on the reagent pre-loaded into each of the reaction chambers, which also depends upon the analyte being detected. The embodiment can be used with detection reagents that are present in either liquid and/or dried form. The second embodiment can utilize vacutainers as the reaction chambers, for example.

Three mixing embodiments are disclosed, which involve mixing liquid samples added to the reaction chambers that include pre-loaded reagents. The embodiments disclosed involve: (1) a handlebar for mixing with solid paddles, (2) a spring and barrel cam for mixing with solid paddles, and (3) a horizontal handlebar for mixing by manually cranking the handlebar and rotating solid paddle rods or paddle wheels.

Any combination of the embodiments of metering and mixing apparatuses can be used together in a system for urinalysis. The system can be all one unit that includes both the metering apparatus and the mixing apparatus, or the system can include a metering apparatus that can be removed and replaced with a mixing apparatus. The entire system can be designed to be sealed, enclosed and contamination proof, which can be safe for an at-home user, for example. Other suitable metering and mixing apparatuses are also contemplated besides those described herein. The system can also include a digital urinalysis device, or sample reader. The reaction chambers, after receiving the urine sample that is mixed with a detection reagent(s) can be analyzed using the sample reader. The reaction chambers can also include orientation markers to help the user know which direction to insert the reaction chambers into the sample reader.

Turning to the figures, FIG. 1 is a schematic, perspective view of a metering apparatus 100, in accordance with embodiments of the disclosure. "Metering" is measurement or regulation by means of a meter. The metering apparatus 100, which can measure a volume of urine, for example, to add to containers with reagents for diagnostic purposes, is shown. The metering apparatus 100 includes a sample holder 102, which holds a urine sample from a patient, for example. The sample holder 102 is connected to a distributor 104 into which the urine sample can flow and be distributed generally horizontally once the sample holder 102 is connected to the distributor 104 and allowed to release the urine sample. As shown, the urine sample is still being held in the sample holder 102. Once the urine is distributed within the distributor 104, it can flow into a plurality of metering reservoirs 106 connected to and arranged along the distributor 104. The distributor 104 and the metering reservoirs 106 can be specially coated with anionic, cationic or zwitterionic surfactants to improve the surface wettability and improve liquid flow and transfer. The metering reservoirs 106 can achieve proper volume inclusion by being sized to accommodate a specific volume of fluid (or urine) required to be added to each of a plurality of reaction chambers 108 and through one of a plurality of dispensing needles 110, which are located between the metering reservoirs 106 and the reaction chambers 108. The plurality of dispensing needles can puncture a rubber seal 111, for example, in the top of each reaction chamber 108. The metering reservoirs 106 can accommodate different volumes that are needed to be added to the reaction chambers 108. The reaction chambers 108 are not vacuum sealed in this embodiment, and the urine flows from the metering reservoirs 106 to the reaction chambers 108 via gravity. The reaction chambers 108 can be cuvettes such as those known in the art. The reaction chambers 108 can each be pre-loaded with one of a plurality of analyte detection reagents 112a-e, as shown.

The analyte detection reagents 112a-e can be any suitable reagent used to detect characteristics of or substances included in urine, relating to the embodiments disclosed herein. For example, the analyte detection reagents 112a-e can be used to detect nitrites, protein or creatine in urine, or to detect the pH or color of urine. The analyte detection reagents 112a-e can also be used to detect leukocytes, blood, ketones, bilirubin, urobilinogen, glucose, albumin and other urinary biomarkers that can be detected via colorimetric methods. The analyte detection reagents 112a-b can be used with different volumes of the urine sample. The analyte detection reagents 112a-e generally can be chemically reactive substances. When the analyte detection reagents 112a-e come into contact with urine, they can carry out a chemical reaction such that an optically detectable parameter of the chemically reactive substance or of the analyte detection reagent changes in an optically detectable manner by changing the color and/or by changing the color intensity. Accordingly, the color, the color intensity, or a color change (either generation of or reduction of color) can be optically detected. The analyte detection reagents 112a-e can have a certain color and addition of urine can lead to a color change through reaction with the constituents of the urine, which, depending on the concentration of the component in the urine, can be different and can provide visual information about the concentration of various constituents in the urine. Values and concentrations of certain analytes, such as blood, erythrocytes, hemoglobin, glucose, ketone bodies, ascorbic acid, protein, leukocytes, nitrite, pH value, bilirubin and urobilinogen, for example, can be identified using the metering apparatus 100.

In some embodiments, reaction chambers 108 can include stabilizers and antimicrobials (i.e., triclosan) to ensure reactions are stable at room temperature for several minutes to hours during analysis. The antimicrobials, for example, can reduce a potential for adverse effects on the detection reagents over time.

The reaction chambers 108 can be rubber-sealed containers that can be loaded with liquid samples via needle puncture, for example. The reaction chambers 108 can be made of an optically clear (in the visible range) material to enable optical detection of reaction products in the reaction chambers, for example. Any suitable material that allows light to pass through the reaction chambers 108 can be used, including materials that allow for downstream transmission, absorption and scattering measurements. Other suitable materials are also contemplated, however. Since the reaction chambers can be clear, mixing is performed until a uniform, stable color can be observed visually. Visual inspection of the contents of the reaction chambers 108 can be used for measurement or diagnostic purposes.

Figure 2:
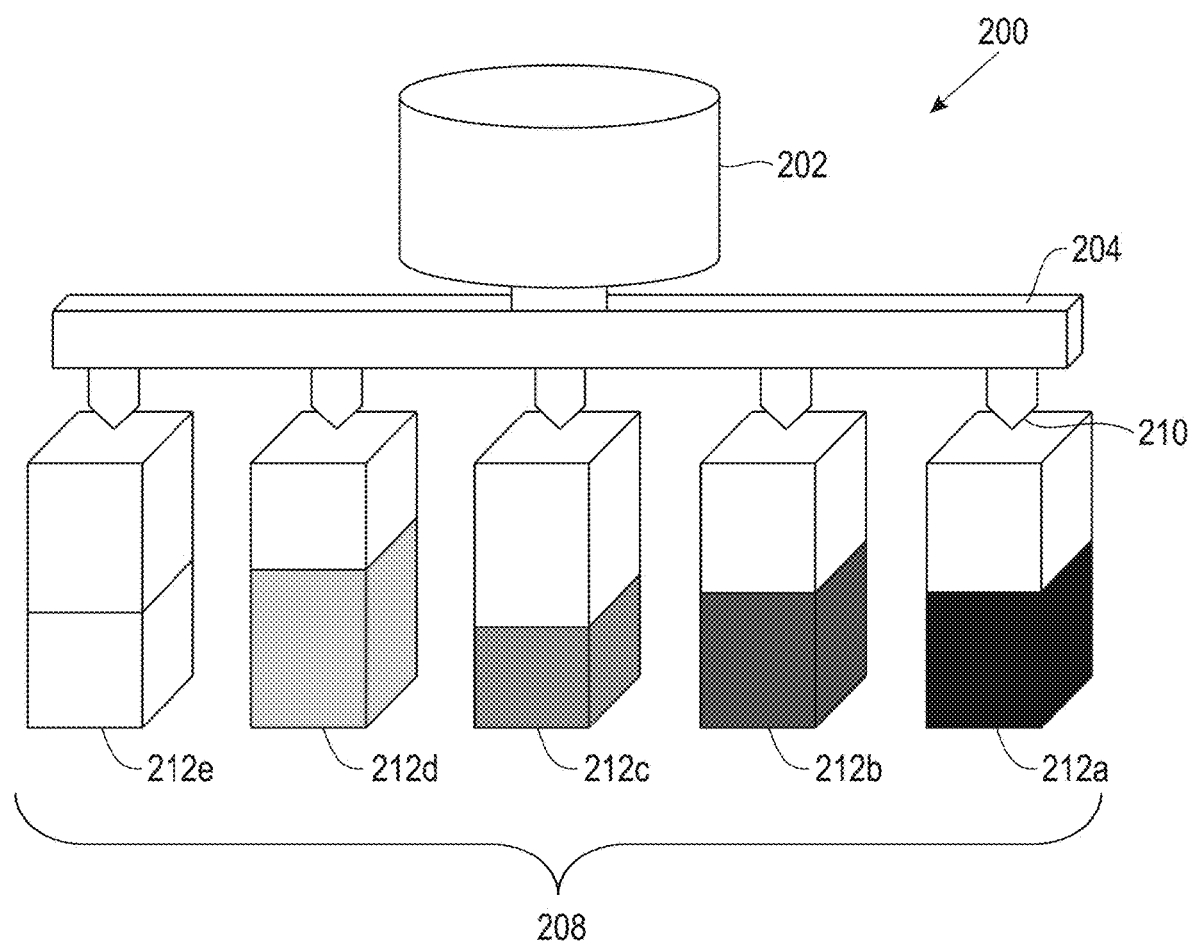
FIG. 2 is a schematic, perspective view of a metering apparatus, in accordance with embodiments of the disclosure.

FIG. 2 is a schematic, perspective view of a metering apparatus 200, in accordance with embodiments of the disclosure. The metering apparatus 200, which can measure a volume of urine to add to containers with reagents for diagnostic purposes, is shown. The metering apparatus 200 includes a sample holder 202, which holds a urine sample from a patient, for example. The sample holder 202 is connected to a distributor 204 into which the urine sample can flow and be generally horizontally distributed once the sample holder 202 is connected to the distributor 204 and allowed to release the urine sample. As shown, the urine sample is still being held in the sample holder 202. Once the urine is distributed within the distributor 204, it can flow into a plurality of reaction chambers 208 and through one of a plurality of dispensing needles 210. The distributor 204 can be coated with anionic, cationic or zwitterionic surfactants to improve the surface wettability and improve liquid flow and transfer. The reaction chambers 208 can be vacuum sealed in this embodiment, and a volume of the urine can flow from the distributor 204 to the reaction chambers 208 by being drawn via vacuum (i.e., a pressure difference). The reaction chambers 208 can each include one of a plurality of analyte detection reagents 212a-e. The analyte detection reagents 212a-e can be any suitable reagent, such as those discussed herein with regard to analyte detection reagents 112a-e in FIG. 1. The reaction chambers 208 can be made of an optically clear material, as shown, as discussed herein with regard to the reaction chambers 208 in FIG. 1. The reaction chambers 208 can be rubber-sealed containers that can be loaded with liquid samples via needle puncture, for example, as in the embodiment of FIG. 1.

In some embodiments of the metering apparatus 100 of FIG. 1 and the metering apparatus 200 of FIG. 2, some of the components of the metering apparatuses 100, 200 be coated with anionic, cationic or zwitterionic surfactants. For example, inner surfaces of the distributors 104, 204, the reaction chambers 108, 208 and/or the dispensing needles 110, 210, can be coated with anionic, cationic or zwitterionic surfactants in order to improve the surface wettability to ensure optimal liquid/urine flow and transfer into the reaction chambers 108, 208.

Figure 3A:
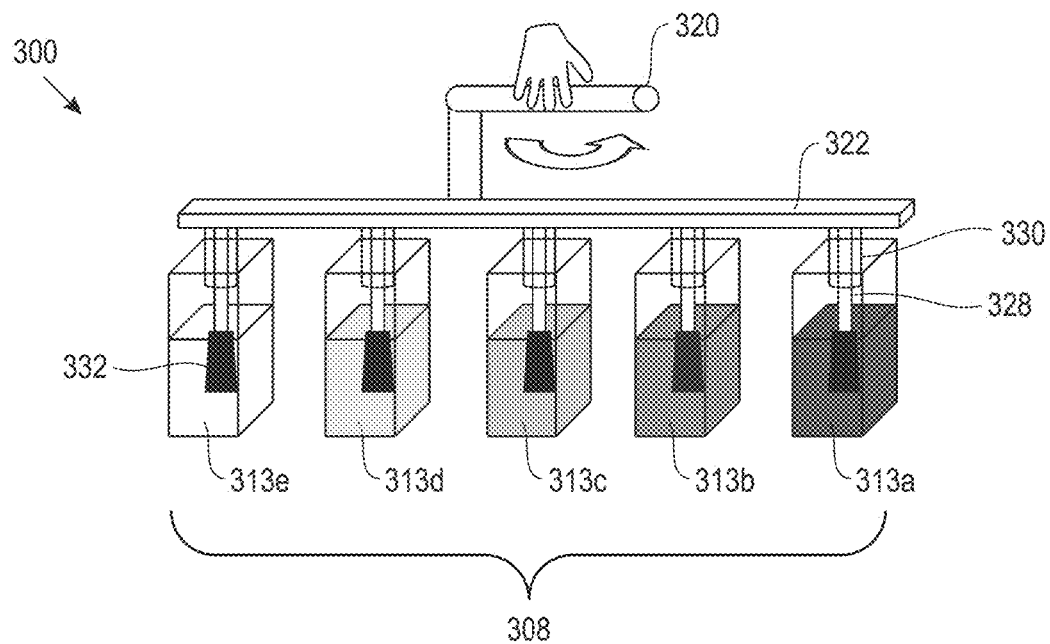
FIG. 3A is a schematic, perspective view of a mixing apparatus, in accordance with embodiments of the disclosure.

FIG. 3A is a schematic, perspective view of a mixing apparatus 300, in accordance with embodiments of the disclosure. The mixing apparatus 300 utilizes handlebar mixing using solid, oar-like paddles. As shown, a handlebar 320 is connected to a gear housing 322, and when the handlebar 320 is rotated (as shown by arrow in FIG. 3A), rotation of a series of gears (shown in FIG. 3B) within the gear housing 322 results. Some of the gears (not shown) can be attached to a plurality of paddle rods 328, extending through a plurality of paddle tubes (or cylinders) 330 into reaction chambers 308, each with a paddle 332 at a distal end. The paddle tubes 330 can be used to dispense urine into the reaction chambers 308. Rotation, or manually spinning, of the handlebar 320 results in rotation of the series of gears (324, 326 in FIG. 3B), which further rotates the paddles 332 thereby mixing the urine samples with the reagents in the reaction chambers 308. The plurality of paddle rods 328 with attached paddles 332 is one example of a plurality of mixing elements that can be used in the mixing apparatus 300. Any suitable configuration of mixing elements that are capable of agitating or mixing the contents of the reaction chambers 308 are contemplated. The mixing can enhance the uniformity of the sample with the detection reagents resulting in more accurate measurements as the chemical reaction takes place. The reaction can be stabilized at room temperature. A stabilizer can be added to each of the reaction chambers 308 in order to stabilize the reactions.

The paddle rods 328 extend into the reaction chambers 308, which are shown as being loaded with urine samples combined with analyte detection reagents using, for example, one of the metering apparatuses 100, 200 as in FIGS. 1 and 2. After being filled with desired volumes of urine, the metering apparatus 100, 200, for example can be removed from the reaction chambers 108, 208, and the mixing apparatus 300 can be placed on the reaction chambers 108, 208 (instead of reaction chambers 308). In some embodiments, the two apparatuses can be used together to meter urine samples and mix the urine samples with analyte detection reagents for diagnostic purposes.

Figure 3B:
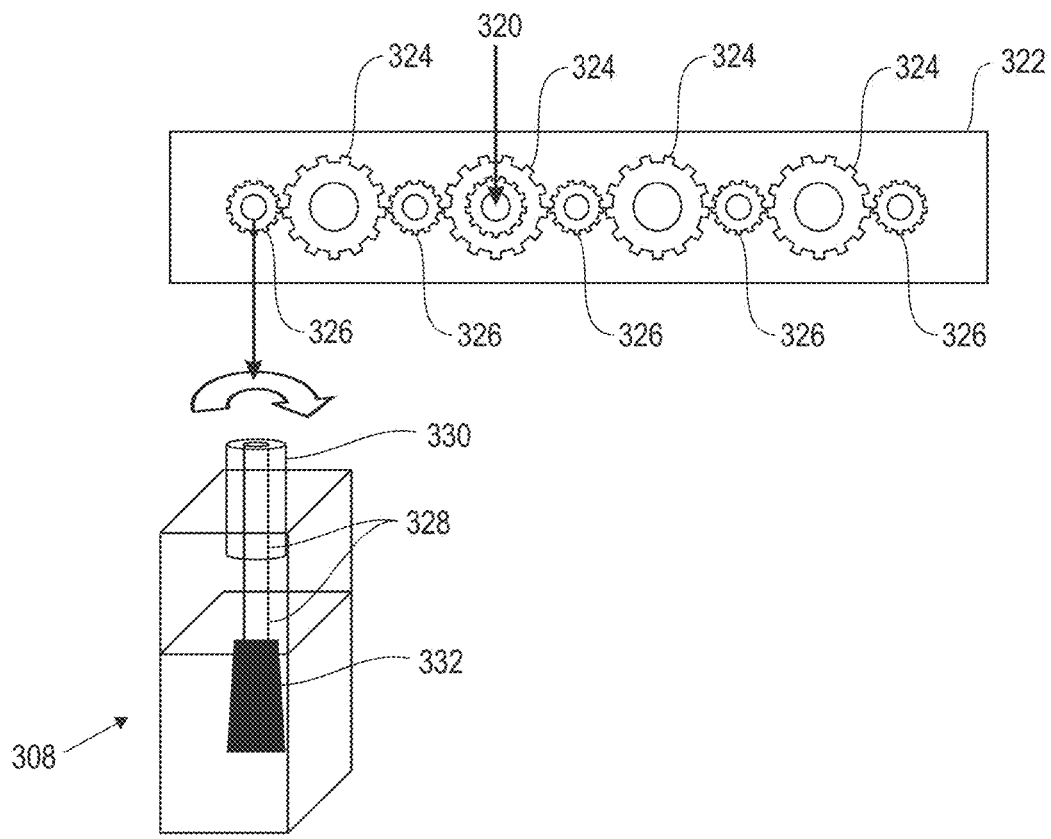
FIG. 3B is a close-up view of one reaction chamber, and a top-down view of a gear housing, both of the mixing apparatus of FIG. 3A, in accordance with embodiments of the disclosure.

FIG. 3B is a close-up view of one of the reaction chambers 308, which includes one paddle rod 328 and one paddle 332, and a top-down view of the gear housing 322, both of the mixing apparatus 300 of FIG. 3A, in accordance with embodiments of the disclosure. The gear housing 322 includes an example of a series, or plurality of, alternating larger diameter gears 324 and small diameter gears 326. The series of gears 324, 326 are interconnected such that movement of one gear causes movement of all of the gears. The series of gears 324, 326 is one example, and other numbers, sizes, and configurations of gears is also contemplated. As shown, the handlebar 320 can be attached to one of the large diameter gears 324. The small diameter gears 326 are attached to paddle rods 328, such as the one shown. Rotation (as shown by arrow in FIG. 3B) of the large diameter gear 324 by the handlebar 320 causes rotation of the small diameter gear 326 and the paddle rod 328, which causes mixing of the fluid in the reaction chamber 308 by the paddle 332. The paddle 332 can vary in size, shape and position. A preferred configuration and position of paddle 332 would be to allow for an increased surface area to contact liquid for mixing while keeping clear of the illumination path of the sensing apparatus through the reaction chambers 308. The reaction chambers 308 can be made of a clear material, as shown, and as discussed herein with regard to the reaction chambers 108 in FIG. 1. The reaction chambers 308 shown each include one of a solution 313a-e of urine with one of a plurality of analyte detection reagents, as discussed herein with regard to the plurality of analyte detection reagents 112a-e in FIG. 1.

Figure 4A:
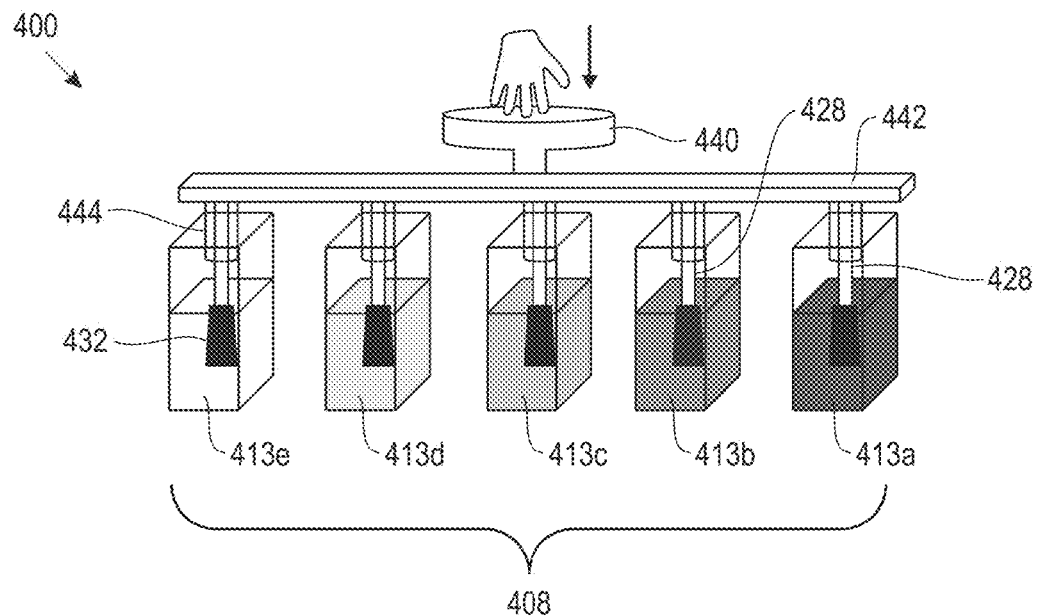
FIG. 4A is a schematic, perspective view of a mixing apparatus, in accordance with embodiments of the disclosure.

FIG. 4A is a schematic, perspective view of a mixing apparatus 400, in accordance with embodiments of the disclosure. The mixing apparatus 400 utilizes spring and barrel cam mixing using solid paddles. As shown, a handle 440 is attached to a force distributor 442. A downward force on the handle 440 can be distributed along the force distributor 442. Attached to the force distributor 442 are a plurality of spring and barrel cams 444 (discussed in more detail with regard to FIG. 4C). Each of the plurality of spring and barrel cams 444 is associated with one of a plurality of reaction chambers 408 (like those discussed with regard to FIG. 1, for example). Each of the plurality of spring and barrel cams 444 is connected to one of a plurality of paddle rods 428, with each paddle rod 428 including one of a plurality of paddles 432 at its distal end, which is located in the reaction chambers 408. The plurality of paddles 432 can vary in shape and size, in order for the surface area of the paddles 432 to be optimized in order to contact a higher volume of the liquid/urine and improve mixing. The plurality of paddles 432 can be placed or located in the reaction chambers at a height such that an illumination path of a sensing apparatus (such as a colorimeter) can be clear. The plurality of paddle rods 429 and paddles 432 shown is one example of a plurality of mixing elements that can be used in the mixing apparatus 400. The paddle 432 can vary in size, shape and position. A preferred configuration and position of paddle 432 would be to allow for increased surface area to contact liquid for mixing while keeping clear of the illumination path of the sensing apparatus through the reaction chambers 408. Any suitable configuration of mixing elements that are capable of agitating or mixing the contents of the reaction chambers 408 are contemplated.

The reaction chambers 408 can be made of an optically clear material, as shown, and as discussed herein with regard to the reaction chambers 108 in FIG. 1. The reaction chambers 408 shown each include one of a solution of urine with one of a plurality of analyte detection reagents 413a-e, as discussed herein with regard to the plurality of analyte detection reagents 112a-e in FIG. 1.

Figure 4B:
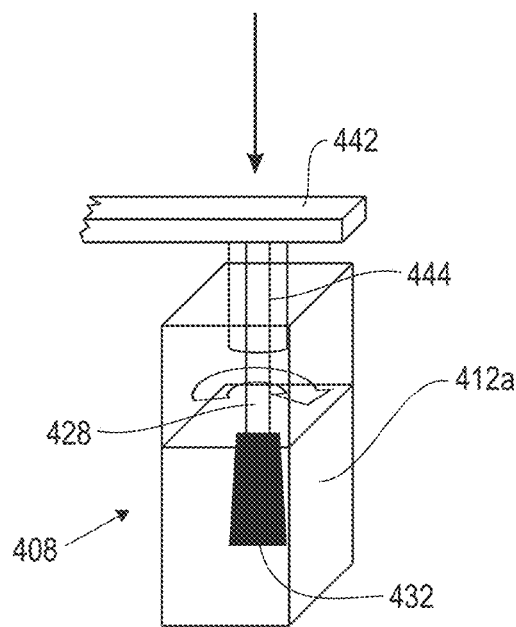
FIG. 4B is a close-up view of a portion of the mixing apparatus of FIG. 4A, in accordance with embodiments of the disclosure.

FIG. 4B is a close-up view of a portion of the mixing apparatus of FIG. 4A, in accordance with embodiments of the disclosure. The figure shows application of a downward force (as indicated by the linear arrow) by the distributor 442 on the spring and barrel cam 444 resulting in rotation of the paddle rod 428 (as indicated by the circular-shaped arrow), which can enable mixing of contents (urine and analyte detection reagents) in the reaction chambers 408.

Figure 4C:
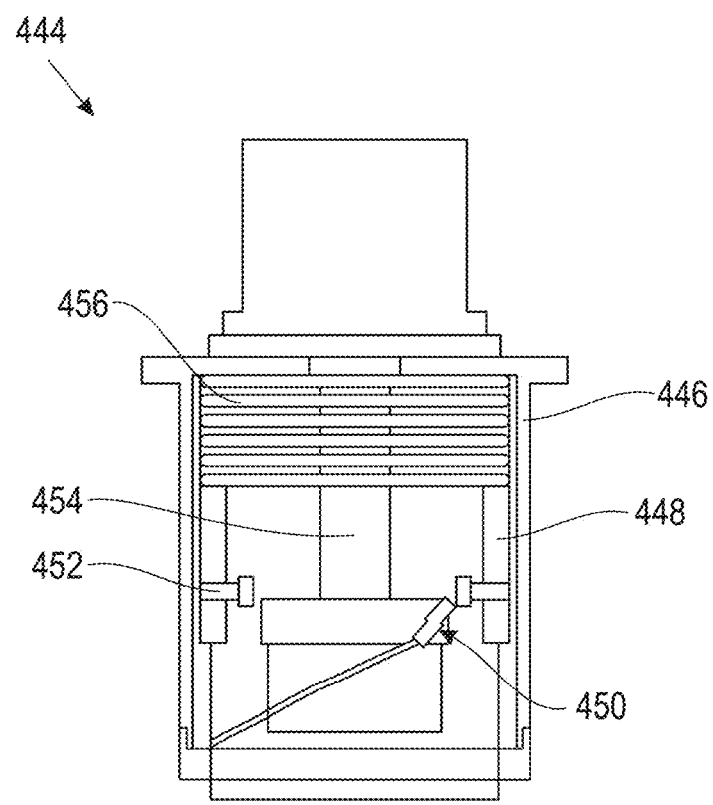
FIG. 4C is a close-up, see-through view of a spring and barrel cam of the mixing apparatus of FIG. 4A.

FIG. 4C is a close-up, see-through view of the spring and barrel cam 444 of the mixing apparatus 400 of FIG. 4A. The spring and barrel cam 444 is an example of an actuation mechanism that can be implemented to move some components of the mixing apparatus 400 relative to one another and initiate the mixing function. The spring and barrel cam 444 as shown includes a housing 446, a barrel 448 inside the housing 446, and a cam groove 450 running on an outer surface of the barrel 448. The housing 446 can include a cam pin 452 for engaging with the cam groove 450 on the barrel 448. In an alternative embodiment, the barrel 448 can include the cam pin 452 and the housing 446 can include the cam groove 450 on an inner surface. The cam pin 452 is configured to engage with and move within the cam groove 450 on the barrel 448 as shown. A plunger 454 is associated with the barrel 448. A compression spring 456 is located within the housing 446 and atop the barrel 448 in order to allow downward movement of the plunger 454, which causes rotation of the barrel 448 in the housing 446 as the cam pin 452 moves in the cam groove 450. The rotation causes the rotation of the paddle rod 428 as shown in FIG. 4B, which enables mixing of the urine and analyte detection reagents in reaction chambers 408. The spring and barrel cam 444 shown is one example, and any suitable such spring and barrel cam or other suitable actuation mechanism is also contemplated by the disclosure. The paddle rod 428 can also be interchanged with any suitable mixing element.

FIG. 5 is a schematic, perspective view of a mixing apparatus 500, in accordance with embodiments of the disclosure. The mixing apparatus 500 includes a horizontal handlebar 560 that extends through and is connected horizontally across a plurality of reaction chambers 508. The horizontal handlebar 560 includes a plurality of discs or paddle wheels 562, with one paddle wheel 562 in each of the reaction chambers 508, in order to provide mixing of solutions 513a-e of urine with one of a plurality of analyte detection reagents. The plurality of paddle wheels 562 can vary in shape and size, in order for the surface area of the paddle wheels 562 to be optimized in order to contact a higher volume of the liquid/urine and improve mixing. The plurality of paddle wheels 562 can be placed or located in the reaction chambers at a height such that an illumination path of a sensing apparatus (such as a colorimeter) can be clear. The paddle wheels 562 can be of any suitable mixing element configuration that provides for mixing of solutions 513a-e. The paddle wheels 562 can vary in size and position. A preferred configuration and position of paddle wheels 562 would be to allow for increased surface area to contact liquid for mixing while keeping clear of the illumination path of the sensing apparatus through the reaction chambers 508. A user can enable mixing by turning the horizontal handlebar 560 once the urine sample has been added to each reaction chamber 508. The reaction chambers 508 can be made of an optically clear material, as shown, and as discussed herein with regard to the reaction chambers 108 in FIG. 1. The reaction chambers 508 shown each include one of the solutions 513a-e of urine with one of a plurality of analyte detection reagents, as discussed herein with regard to the plurality of analyte detection reagents 112a-e in FIG. 1.

The mixing apparatuses 300, 400 and 500, as discussed above, are tailored for manual, passive mixing. These mixing apparatuses 300, 400 and 500 do not need actuators, motors, or external energy sources in order to function.

Figure 6:
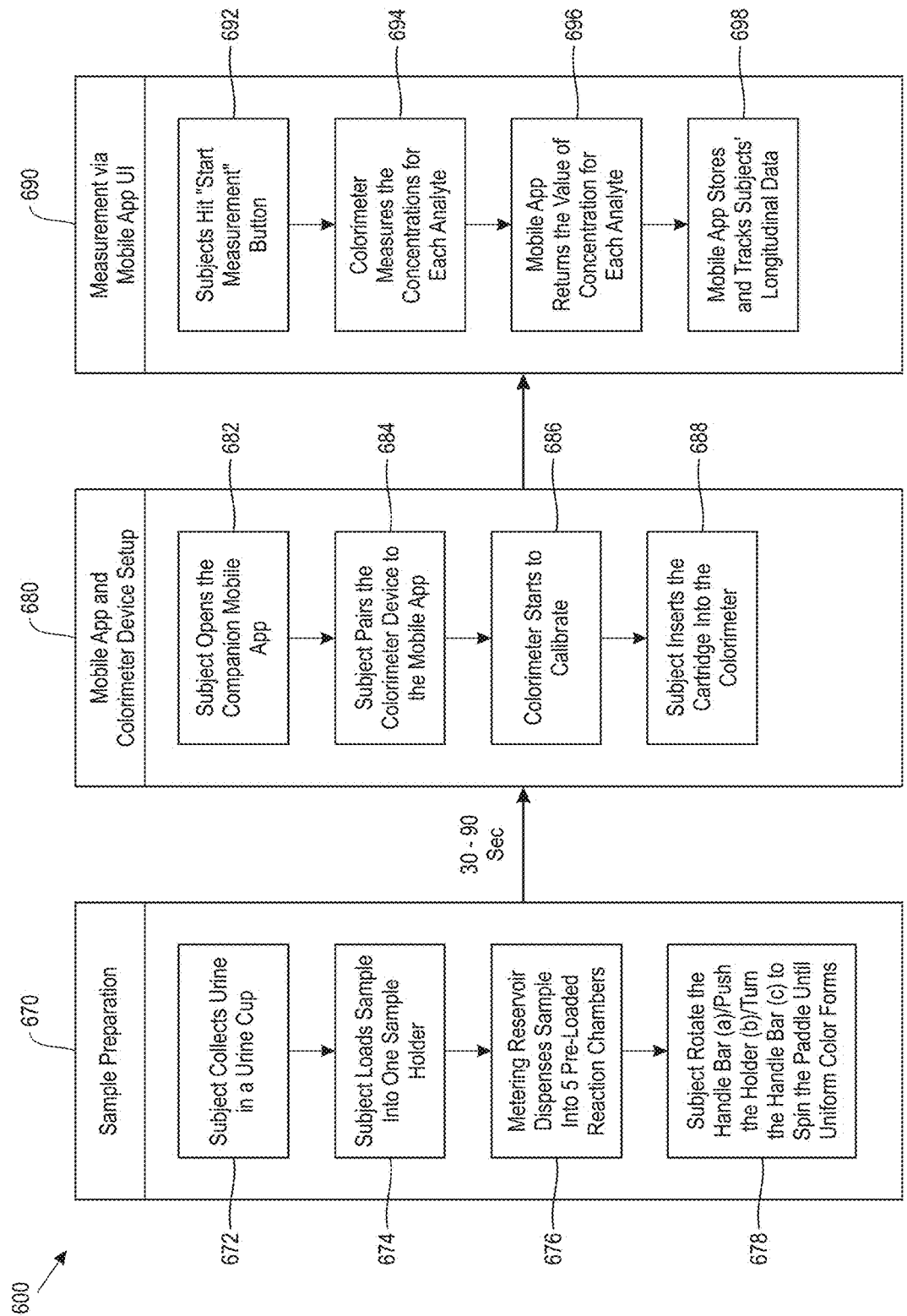
FIG. 6 is a flowchart of a process of urinalysis, in accordance with embodiments of the disclosure.

FIG. 6 is a flowchart of a process 600 of digital urinalysis, in accordance with embodiments of the disclosure. The process 600 can involve using the metering apparatus 100 of FIG. 1, for example, together with any of the mixing apparatuses 300, 400 or 500 in FIGS. 3A, 4A and 5, and disclosed herein.

Block 670 includes operations for sample preparation. Within block 670, block 672 includes an operation of a subject collecting a urine sample in a urine cup. Block 674 includes an operation of the subject loading the urine sample into the sample holder 102 of the metering apparatus 100 (FIG. 1). The urine sample is distributed through the distributor 104 to the plurality of metering reservoirs 106. Block 676 includes an operation of dispensing the urine sample in the plurality of metering reservoirs 106 and through into the plurality of reaction chambers 108. Block 678 involves mixing the urine with analyte detection reagents 112a-e that were pre-loaded into the reaction chambers 108. The metering apparatus 100 can then be left intact or removed from the reaction chambers 108. If the metering apparatus is left intact, any of the mixing apparatuses 300, 400 or 500 disclosed herein, can be used directly to mix the urine with the analyte detection reagents 112a-e. If the metering apparatus is removed, any of the mixing apparatuses 300, 400 or 500 disclosed herein, or other suitable mixing apparatuses, can then be placed onto the reaction chambers 108 and can mix the urine and analyte detection reagents 112a-e until a uniform color forms, for example. After a uniform color appears in each of the reaction chambers 108, then thirty (30) to ninety (90) seconds can be allowed to pass. The time range of thirty (30) to ninety (90) seconds is an example, and is provided due to reaction times for protein, creatine, nitrite and pH assays being rapid, and reaching steady state between thirty (30) to ninety (90) seconds. Other assays can be performed using the described apparatuses and method, so the reaction times can vary.

Block 680 includes operations for a mobile application colorimeter device setup. Block 682 includes an operation of the subject opening a companion mobile application to a colorimeter device being used. Block 684 includes an operation of the subject pairing the colorimeter device to the mobile application. Block 686 includes an operation to calibrate the colorimeter device. Block 688 includes an operation of the subject inserting a cartridge including the mixed, plurality of reaction chambers 108, into the colorimeter.

Block 690 includes operations for measurements being performed via the mobile application. Block 692 includes an operation of the subject hitting a "start measurement," or the like, button. Block 694 includes an operation of the colorimeter device measuring concentrations for each of the analytes being detected. Block 696 includes an operation of the mobile application returning a value of the concentration for each analyte. Block 698 includes an operation of the mobile application storing and tracking the subject's longitudinal data.

Figure 7:
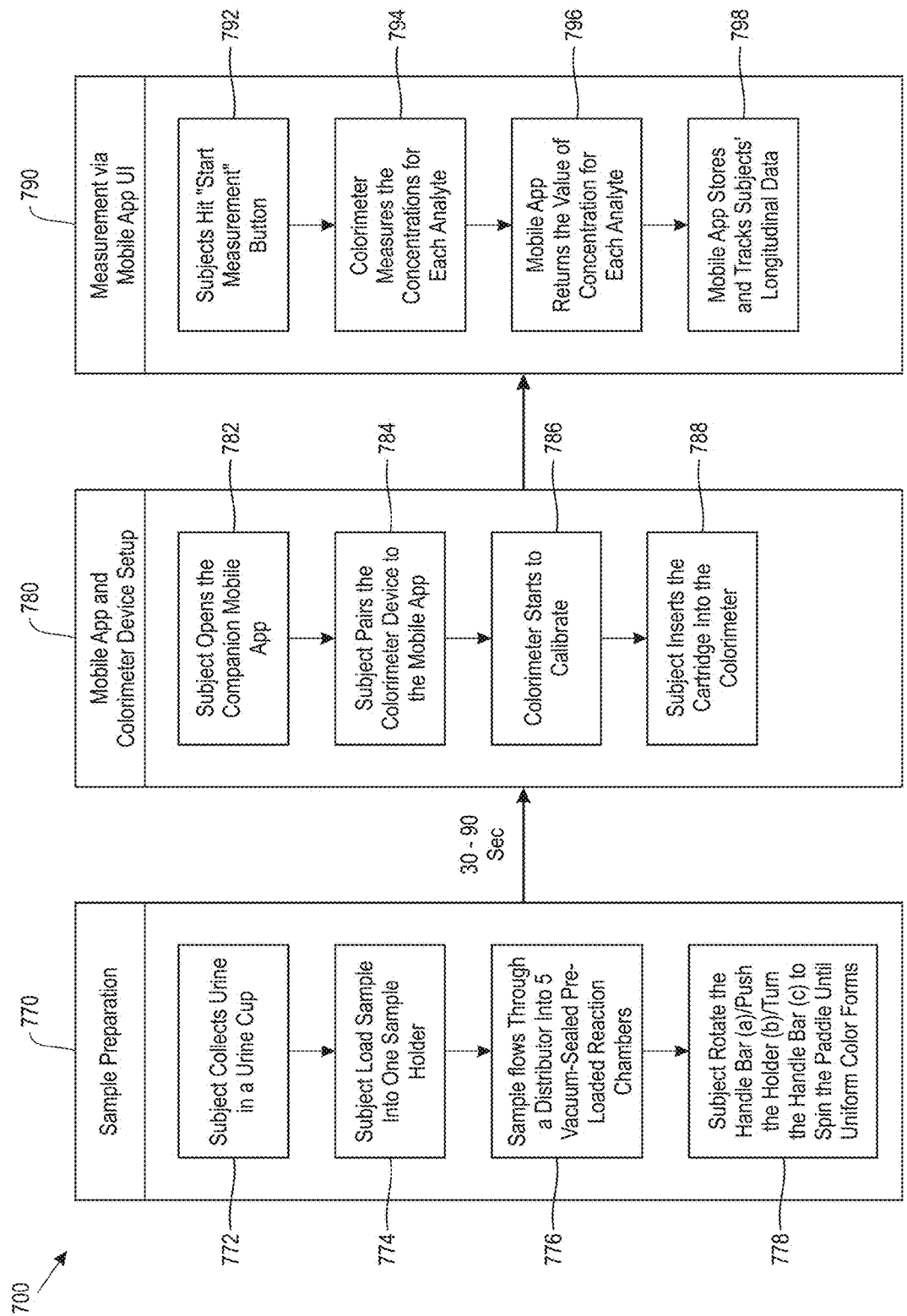
FIG. 7 is a flowchart of a process of urinalysis, in accordance with embodiments of the disclosure.

FIG. 7 is a flowchart of a process 700 of digital urinalysis, in accordance with embodiments of the disclosure. The process 700 can involve using the metering apparatus 200 of FIG. 2, for example, together with any of the mixing apparatuses 300, 400 or 500 in FIGS. 3A, 4A and 5, and disclosed herein.

Block 770 includes operations for sample preparation. Within block 770, block 772 includes an operation of a subject collecting a urine specimen in a urine cup. Block 774 includes an operation of the subject loading a urine sample into the sample holder 202 of the metering apparatus 200 (FIG. 2). Block 776 includes an operation of the urine sample being distributed through the distributor 204 and into the plurality of reaction chambers 208 that are vacuum-sealed. Block 778 involves mixing the urine with analyte detection reagents 212a-e that were pre-loaded into reaction chambers 208. The metering apparatus 200 can then be removed from the reaction chambers 208. If the metering apparatus is left intact, any of the mixing apparatuses 300, 400 or 500 disclosed herein, can be used directly to mix the urine with the analyte detection reagents 212a-e. If the metering apparatus is removed, any of the mixing apparatuses 300, 400 or 500 disclosed herein, or other suitable mixing apparatuses, can then be placed onto the reaction chambers 208 and can mix the urine and analyte detection reagents 212a-e until a uniform color forms, for example. After a uniform color appears in each of the reaction chambers 208, then thirty (30) to ninety (90) seconds can be allowed to pass. The time range of thirty (30) to ninety (90) seconds is an example, and is provided due to reaction times for protein, creatine, nitrite and pH assays being rapid, and reaching steady state between thirty (30) to ninety (90) seconds. Other assays can be performed using the described apparatuses and method, so the reaction times can vary.

Block 780 includes operations for a mobile application colorimeter device setup. Block 782 includes an operation of the subject opening a companion mobile application to a colorimeter device being used. Block 784 includes an operation of the subject pairing the colorimeter device to the mobile application. Block 786 includes an operation of the colorimeter device starting to calibrate. Block 788 includes an operation of the subject inserting a cartridge, including the mixed, plurality of reaction chambers 208, into the colorimeter.

Block 790 includes operations for measurements being performed via the mobile application. Block 792 includes an operation of the subject hitting a "start measurement," or the like, button. Block 794 includes an operation of the colorimeter device measuring concentrations for each of the analytes being detected. Block 796 includes an operation of the mobile application returning a value of the concentration for each analyte. Block 798 includes an operation of the mobile application storing and tracking the subject's longitudinal data.

Figure 8:
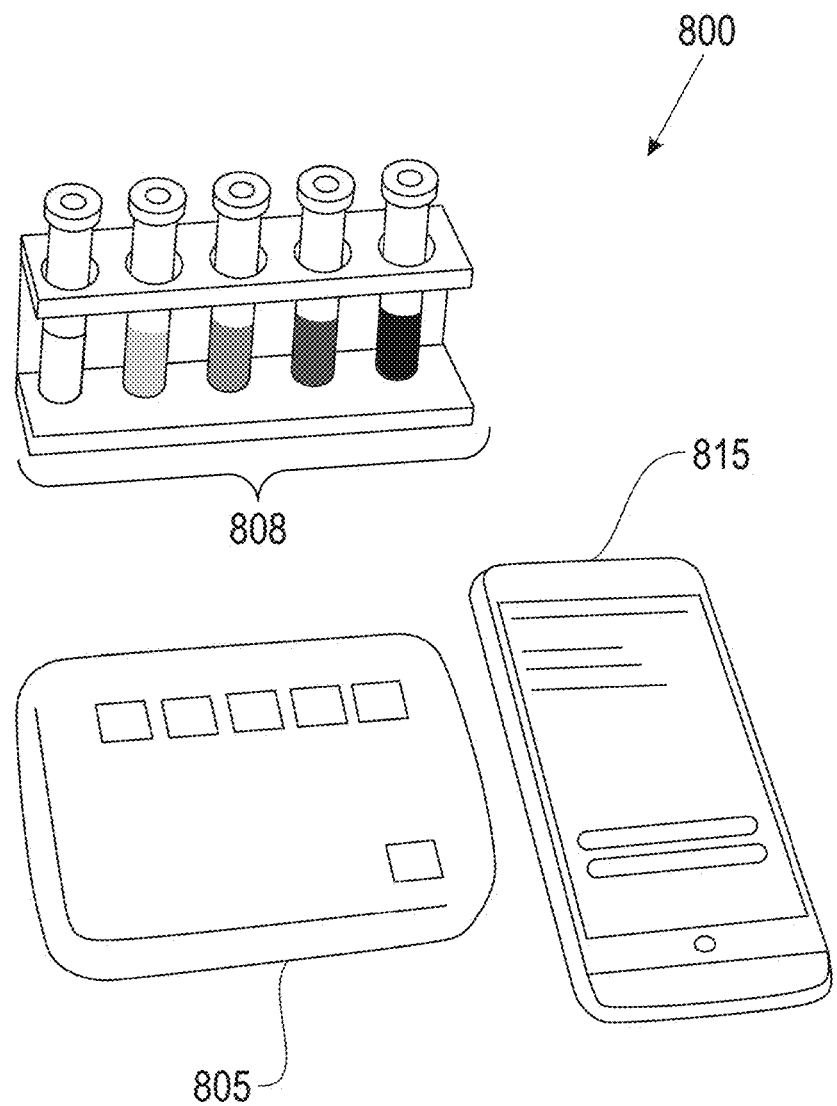
FIG. 8 is a schematic, perspective view of components of a system, in accordance with embodiments of the disclosure.

FIG. 8 is a schematic, perspective view of components of a system 800, in accordance with embodiments of the disclosure. The system 800 can also include the metering apparatus 100 of FIG. 1 or the metering apparatus of FIG. 2, for example, together with any of the mixing apparatuses 300, 400 or 500 in FIGS. 3A, 4A and 5, as disclosed herein. One of the mixing apparatuses and one of the metering apparatuses can be used to prepare multiple reaction chambers 808 that each include a metered and mixed sample of urine together with an analyte detection reagent. Once prepared, the reaction chambers 808 can be inserted into a colorimeter 805 for analysis. The colorimeter 805 is a light sensing device that can be used to measure the absorbance, transmittance and scattering of light as it moves through a sample of liquid. The colorimeter 805, as shown, can measure concentrations for each of a plurality of analytes being detected. The colorimeter 805 can be in communication with a mobile device 815 that can use a mobile application. The mobile application can return a value of the concentration for each analyte being analyzed. The mobile application can also store and track a subject's longitudinal data being analyzed.

For purposes of description herein, the terms "upper," "lower," "top," "bottom," "left," "right," "rear," "front," "vertical," "horizontal," and derivatives thereof shall relate to the devices as oriented in the figures. However, it is to be understood that the devices can assume various alternative orientations and step sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A liquid metering and mixing system for preparing a plurality of samples for analysis, the system comprising:
a liquid metering apparatus disposed in fluid communication with a sample holder and a plurality of reaction chambers and configured to meter a volume of a liquid into each of the plurality of reaction chambers, wherein each of the plurality of reaction chambers includes a reagent; and
a mixing apparatus comprising a plurality of mixing elements, wherein each of the plurality of mixing elements is disposed in a corresponding reaction chamber of the plurality of reaction chambers and is rotated in the plurality of reaction chambers and is adapted to mix the volume of the liquid with the reagent in preparation for analysis.

2. The system of claim 1, wherein the liquid metering apparatus is adapted to dispense the liquid into each of the plurality of reaction chambers using gravity induced flow.

3. The system of claim 1, wherein the liquid metering apparatus is adapted to dispense the liquid into each of the plurality of reaction chambers using a pressure differential between the liquid metering apparatus and each of the plurality of reaction chambers.

4. The system of claim 1, wherein the liquid metering apparatus includes a distributor in fluid communication with the sample holder that is adapted to distribute the liquid above a plurality of metering reservoirs that are in fluid communication with the plurality of reaction chambers and the plurality of metering reservoirs are each adapted to meter the volume of the liquid into each of the plurality of reaction chambers.

5. The system of claim 1, wherein the volume of the liquid metered into each of the plurality of reaction chambers is dependent upon the reagent included in each of the plurality of reaction chambers.

6. The system of claim 1, wherein each of the plurality of mixing elements includes an agitator disposed within the corresponding reaction chamber of the plurality of reaction chambers.

7. The system of claim 1, wherein the mixing apparatus includes a handlebar that is connected to a gear housing including a series of interconnected gears, the plurality of mixing elements being each attached to one of the series of gears, the mixing apparatus being adapted such that when the handlebar is turned, the series of gears are rotated and cause the plurality of mixing elements to be rotated in the plurality of reaction chambers.

8. The system of claim 1, wherein the mixing apparatus includes a handle that is connected to a force distributor, the force distributor connected to a plurality of spring and barrel cams that are each connected to one of the plurality of mixing elements, the mixing apparatus being adapted such that when the handlebar is depressed, the force distributor applies a force to the plurality of spring barrel cams that cause the plurality of mixing elements to be rotated in the plurality of reaction chambers.

9. A liquid sample testing system comprising:
a liquid metering apparatus disposed in fluid communication with a sample holder and a plurality of reaction chambers and adapted to meter a volume of a liquid into each of the plurality of reaction chambers, wherein each of the plurality of reaction chambers includes a reagent;
a mixing apparatus comprising a plurality of mixing elements, wherein each of the plurality of mixing elements is disposed in a corresponding reaction chamber of the plurality of reaction chambers and is rotated in the plurality of reaction chambers and is adapted to mix the volume of the liquid with the reagent in preparation for analysis; and
a colorimeter disposed in optical communication with at least one of the plurality of reaction chambers.

10. The system of claim 9, wherein the liquid metering apparatus is adapted to dispense the liquid into the plurality of reaction chambers using gravity induced flow.

11. The system of claim 9, wherein the liquid metering apparatus is adapted to dispense the liquid into each of the plurality of reaction chambers using a pressure differential between the liquid metering apparatus and each of the plurality of reaction chambers.

12. The system of claim 9, wherein each mixing apparatus includes an agitator disposed within each of the plurality of reaction chambers.

13. The system of claim 9, wherein the liquid metering apparatus is adapted to dispense the volume of the liquid into each of the plurality of reaction chambers according to the reagent in the reaction chamber.

14. The system of claim 9, wherein the mixing apparatus includes a motion transfer element connected to at least one of the plurality of mixing elements.

15. A method of preparing a liquid sample for analysis, the method comprising:
metering a volume of the liquid sample into each of a plurality of reaction chambers that each include a reagent;
rotating a plurality of mixing elements in each of the plurality of reaction chambers; and
mixing the volume of the liquid sample with the reagent in each of the plurality of reaction chambers.

16. The method of claim 15, further comprising:
providing a liquid metering apparatus disposed in fluid communication with a sample holder and the plurality of reaction chambers and adapted to meter the volume of the liquid sample into each of the plurality of reaction chambers; and
providing a mixing apparatus comprising a plurality of mixing elements, wherein each of the plurality of mixing elements is disposed in a corresponding reaction chamber of the plurality of reaction chambers and is adapted to mix the volume of the liquid with the reagent in preparation for analysis.

17. The method of claim 16, further comprising:
dispensing the volume of the liquid sample into each of the plurality of reaction chambers using a pressure differential between the liquid metering apparatus and each of the plurality of reaction chambers.

18. The method of claim 16, further comprising:
dispensing the volume of the liquid sample into each of the plurality of reaction chambers using gravity induced flow.

19. The method of claim 16, further comprising:
mixing the volume of the liquid sample with the reagent using a handlebar that is connected to a gear housing including a series of interconnected gears, the plurality of mixing elements being each attached to one of the series of gears, the mixing apparatus being adapted such that when the handlebar is turned, the series of gears are rotated and cause the plurality of mixing elements to be rotated in the plurality of reaction chambers.

20. The method of claim 16, further comprising:
mixing the volume of the liquid sample with the reagent using a handle bar that is connected to a force distributor, the force distributor connected to a plurality of spring and barrel cams that are each connected to one of the plurality of mixing elements, the mixing apparatus being adapted such that when the handlebar is depressed, the force distributor applies a force to the plurality of spring barrel cams that cause the plurality of mixing elements to be rotated in the plurality of reaction chambers.

* * * * *